July 5, 1932. A. W. DE VOUT ET AL 1,866,509
CHILL ROLL
Filed Feb. 16, 1931
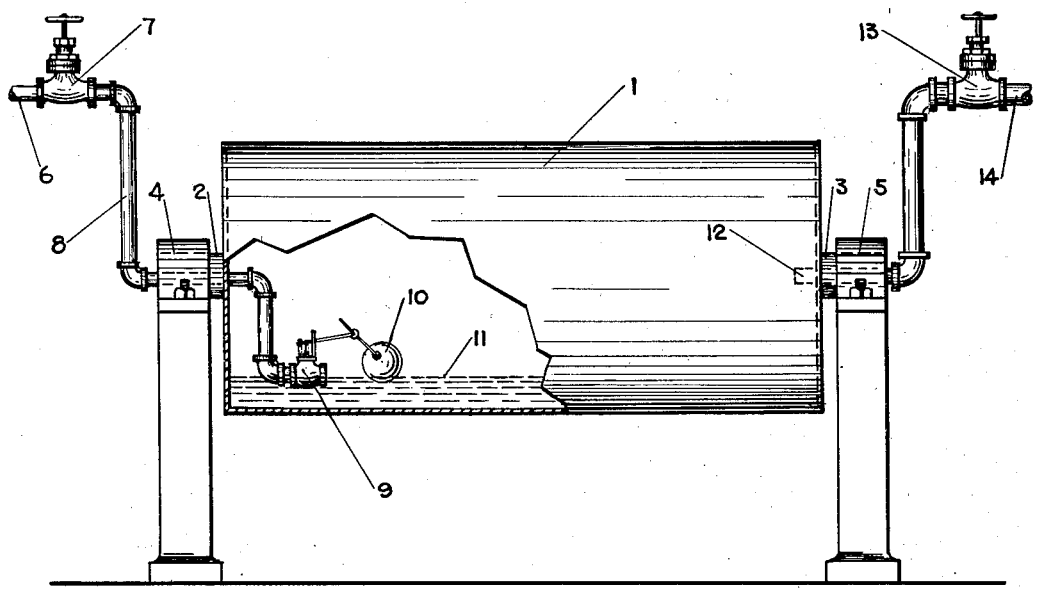

Patented July 5, 1932

1,866,509

UNITED STATES PATENT OFFICE

ANSON W. DE VOUT AND RICHARD W. REGENSBURGER, OF CHICAGO, ILLINOIS, ASSIGNORS, BY MESNE ASSIGNMENTS, TO INDUSTRIAL PATENTS CORPORATION, OF CHICAGO, ILLINOIS, A CORPORATION OF DELAWARE

CHILL ROLL

Application filed February 16, 1931. Serial No. 516,048.

Our invention relates to temperature control of direct expansion refrigerated chill rolls. One of the objects of our invention is to permit more exact control than has heretofore been possible with known chill rolls.

Other objects of our invention will be apparent from the description which follows.

Referring now to the drawing which is a perspective view of a hollow chill roll broken away to show the float control valve. Chill roll 1 is rigidly affixed to shafts 2 and 3 which are journalled respectively in bearings 4 and 5 to permit of axial rotation. In the specific embodiment of our invention shown, a liquid refrigerant such as ammonia enters through line 6 passing through liquid pressure reducing valve 7 and entering the roll through line 8, which passes into the roll through an opening provided in shaft or trunnion 2, appropriate means to effect a seal being provided. The ammonia gains entry into the interior of the roll through liquid float control valve 9 which is automatically controlled by float 10, maintaining the level of liquid 11. The gas passes out through pipe 12, which passes out of the roll through shaft or trunnion 3, appropriate means being provided to effect a seal. The line 12 leads the gas to the pressure regulating valve 13 into pipe 14 which carries the gas to the ammonia compressor. Where used, liquid pressure reducing valve 7 and pressure regulating valve 13 may be either spring loaded or weight loaded such that they can be set for a definite pressure.

We have found in practice that liquid pressure reducing valve 7 is not necessary inasmuch as float valve 9 if properly constructed adequately controls the intake of liquid ammonia. We have shown liquid pressure reducing valve 7 to be used merely as a safety measure. It will be noted that the chill roll revolves, agitating the liquid to some extent. The intake and outlet lines of the valves are fixed. Consequently, it is not possible to get absolutely exact pre-determined levels of liquid within the roll. The approximation obtained, however, is exact enough for satisfactory commercial operation and a considerable advance over any means for regulating the level of ammonia in the chill roll which has come to my attention. The roll which we have shown and described is particularly adapted for use in chilling eggs which have been removed from the shell, but it is to be understood that it may be used either with or without modifications for any purpose for which a direct expansion roll may be indicated. The float valve we have shown is merely by way of illustration and not by way of limitation. Other valves may be used such, for example, as the type of valve in which the float only is placed within the roll, being regulated by a rod running to the valve outside the roll.

In operation, of course, the product to be chilled is fed upon the outer surface of the roll in a film of any desired thickness being taken off, before completing the revolution, by appropriate means such as a knife bar or shaver. Inasmuch as our invention relates specifically to temperature control of direct expansion, refrigerated chill rolls without regard to product feeding means or product takeoff means, we have not shown feeding or takeoff means in the drawing.

Although we have mentioned only ammonia, it is to be understood that our invention may be utilized with any liquid refrigerant which is in a gaseous state at atmospheric pressures.

We claim:

1. A direct expansion refrigerated chill roll, means for rotatably supporting the chill roll, an intake pipe for a liquified gaseous refrigerant leading into said roll through a trunnion at one end of the latter and terminating within the roll adjacent the end through which it enters, a float control valve within the chill roll to control the flow through said intake pipe, and an outlet pipe leading out of the opposite end of the chill roll through a trunnion at said end of the roll, spaced from and unconnected with said intake pipe, for withdrawing gas from the chill roll.

2. A direct expansion refrigerated chill roll, means for rotatably supporting the chill roll, an intake pipe for a liquified gaseous refrigerant leading into said roll through a trunnion at one end of the latter and terminating within the roll adjacent the end through which it enters, a float control valve within the chill roll to control the flow through said intake pipe, an outlet pipe leading out of the opposite end of the chill roll through a trunnion at said end of the roll, spaced from and unconnected with said intake pipe, for withdrawing gas from the chill roll, and gas regulating valves on said intake and outlet pipes.

Signed at Chicago, Illinois, this 11th day of February, 1931.

ANSON W. DE VOUT.
RICHARD W. REGENSBURGER.